United States Patent Office 3,257,400
Patented June 21, 1966

3,257,400
2-AMINO-5,6-DIHYDROBENZO[h]QUINAZOLIN-4(3H)-ONE AND CONGENERS
Hans A. Wagner, Skokie, Ill., assignor to G. D. Searle & Co., Chicago, Ill., a corporation of Delaware
No Drawing. Filed June 10, 1964, Ser. No. 374,163
8 Claims. (Cl. 260—256.4)

This invention relates to 2-amino-5,6-dihydrobenzo[h]quinazolin-4(3H)-one and congeners, and to processes for the preparation thereof. More particularly, this invention provides novel, useful, and unobvious chemical compounds of the formula

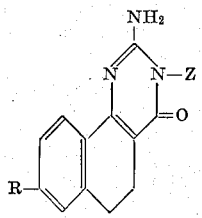

wherein R represents hydrogen, a hydroxyl, or an alkoxy radical and Z represents hydrogen or an alkyl, hydroxyalkyl, alkenyl, or alkynyl radical.

Among the alkoxy radicals represented by R, especially lower alkoxy groupings are preferred, which is to say radicals of the formula lower alkyl—O— the lower alkyl constituent being—as those skilled in the art will recognize from the name—methyl, ethyl, propyl, isopropyl, butyl, isobutyl, sec-butyl, tert-butyl, pentyl, neopentyl, hexyl, isohexyl, heptyl, or like monovalent, saturated, acyclic, straight- or branched-chain, hydrocarbon grouping of the formula $$-C_nH_{2n+1}$$

wherein $n$ represents a positive integer less than 8.

The alkyl and hydroxyalkyl radicals represented by Z likewise are most desirably of lower order, and thus can be enformulated $$-C_nH_{2n}X$$

wherein X represents hydrogen or a hydroxyl and $n$ is defined as before. The alkenyl and alkynyl radicals represented by Z are such as vinyl, allyl, propenyl, 2-methylpropenyl, methylallyl, butenyl (1-, 2-, or 3-), propynyl (1- or 2-), butynyl (1-, 2-, or 3-), and like monovalent, acyclic, straight- or branched-chain, hydrocarbon groupings containing either a double or triple bond and having the formulas $$-C_aH_{2a-1}$$

and $$-C_bH_{2b-3}$$

wherein $a$ and $b$ represent positive integers greater than 1 and 2, respectively, and preferably less than 5.

The compounds of this invention exist not only in the ketonic state depicted above but also, where there is hydrogen in the 3-position, as enols eventuating from a prototropic tautomerization whereby the 4-oxygen is converted to hydroxyl and a 3,4-double bond is introduced. Relative amounts of such different forms of the same compounds in existence under any given circumstances are dependent upon the physical state of the substances involved, and their environment: whether they be solid or liquid and, if dissolved, in what solvent and at what pH. Because the various forms in which tautomers exist cannot readily be represented by a single formula the subject compounds are named and enformulated exclusively as ketones *for convenience only;* however, both keto and enol forms alike are within the ambit of the described invention.

The compounds to which this invention relates are characterized by valuable pharmacological properties. Thus, for example, they promote diuresis (both directly and by blocking the effect of desoxycorticosterone acetate on urinary sodium and potassium); they counteract edema-formation characteristic of the inflammatory response to tissue insult; and they reduce plasma cholesterol levels in hypercholesterolemic subjects. They also inhibit cotyledenous seed germination.

Preparation of the compounds hereof wherein Z represents hydrogen proceeds by heating an appropriate 2-methoxycarbonyl-1-tetralone

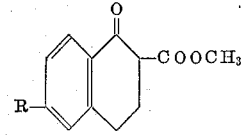

with guanidine carbonate in ethanol solution, R in the formula being defined as before. From the product thus obtained, the remaining components of the invention are prepared by dissolution in methanolic sodium methoxide and subsequent heating with an appropriate halide of the formula

Z—X wherein Z represents an alkyl, hydroxyalkyl, alkenyl, or alkynyl radical and X represents especially bromine or iodine. As an exception to the latter procedure, 2-amino-5,6-dihydro-3-vinylbenzo[h]quinazolin-4(3H)one is prepared by heating an appropriate product of the formula

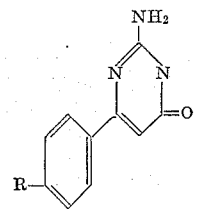

with aqueous 48% hydrogen bromide to produce the 3-bromoethyl derivative, which splits out hydrogen bromide on heating with potassium tert-butoxide in xylene solution to give the 3-vinyl compound.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise indicated.

EXAMPLE 1

*2-amino-5,6-dihydrobenzo[h]quinazolin-4(3H)-one.*—A mixture of 100 parts of 2-methoxycarbonyl-1-tetralone and 80 parts of guanidine carbonate in 750 parts of anhydrous ethanol is heated at the boiling point under reflux for 20 hours, then stripped of solvent by vacuum distillation. To the residue, 1000 parts of water is added with stirring, followed by sufficient glacial acetic acid to neutralize the alkalinity. Insoluble solids are filtered off, consecutively washed on the filter with water and acetone, and recrystallized from ethanol to give 2-amino-5,6-dihydrobenzo[h]quinazolin-4(3H)-one as white rods melting above 300°. The product has the formula

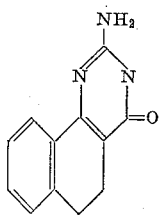

EXAMPLE 2

*2-amino - 5,6 - dihydro-3-methylbenzo[h]quinazolin-4(3H)-one.*—To a solution of 21 parts of 2-amino-5,6-dihydrobenzo[h]quinazolin-4(3H)-one in a solution of 7 parts of sodium methoxide in 300 parts of methanol is added 20 parts of methyl iodide. The resultant mixture is heated at the boiling point under reflux with agitation for 18 hours. Methanol is removed by vacuum distillation, whereupon the residue is diluted with 1000 parts of aqueous 2% sodium hydroxide and the mixture thus obtained stirred for 2 hours at room temperatures. Insoluble solids are then filtered off, washed thoroughly with cold water, and dried in air. The product thus isolated is 2-amino-5,6-dihydro-3-methylbenzo[h]quinazolin-4(3H)-one, having the formula

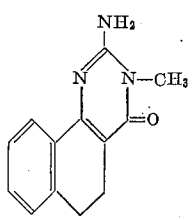

EXAMPLE 3

*2-amino - 3 - ethyl - 5,6 - dihydrobenzo[h]quinazolin-4(3H)-one.*—Substitution of 18 parts of ethyl bromide for the methyl iodide called for in Example 2 affords, by the procedure there detailed 2-amino-3-ethyl-5,6-dihydrobenzo[h]quinazolin-4(3H)-one, of the formula

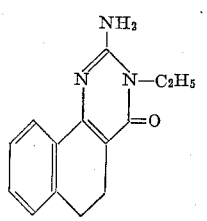

EXAMPLE 4

*2-amino - 5,6 - dihydro-3-(2-hydroxyethyl)benzo[h] quinazolin-4(3H)-one.*—To a solution of 21 parts of 2-amino - 5,6 - dihydrobenzo[h]quinazolin-4(3H)-one in a solution of 7 parts of sodium methoxide in 300 parts of methanol is added 16 parts of 2-bromoethanol. The resultant mixture is heated at the boiling point under reflux with agitation for 18 hours, then freed of methanol by vacuum distillation. The residue is diluted with 1000 parts of aqueous 2% sodium hydroxide, and the mixture thus obtained is stirred for 2 hours at room temperatures. Insoluble solids are filtered off, washed thoroughly with cold water, dried in air, and recrystallized from methanol to give 2-amino - 5,6 - dihydro-3(2-hydroxyethyl)benzo-[h]quinazolin-4(3H)-one as white plates melting at approximately 208–209°. The product has the formula

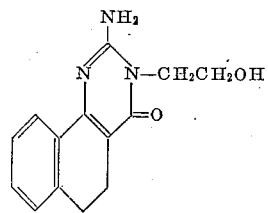

EXAMPLE 5

*2-amino - 5,6 - dihydro-3-(3-hydroxypropyl)benzo[h] quinazolin-4(3H)-one.*—Substitution of 18 parts of 3-chloropropanol for the methyl iodide called for in Example 2 affords, by the procedure there detailed, 2-amino-5,6 - dihydro - 3(3-hydroxypropyl)benzo[h]quinazolin-4(3H)-one, having the formula

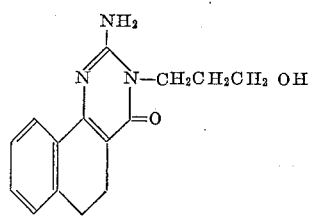

EXAMPLE 6

(A) *2-amino-3-(2-bromoethyl) - 5,6 - dihydrobenzo [h]quinazolin-4(3H)-one.*—A mixture of 10 parts of 2-amino-5,6-dihydro - 3 - (2-hydroxyethyl)benzo[h]quinazolin-4(3H)-one and 75 parts of aqueous 48% hydrogen bromide is heated at the boiling point under reflux for 2 hours, then poured onto 3 volumes of ice. The resultant mixture is made alkaline with potassium carbonate. The insoluble product thrown down is filtered off and dried in air. The material thus isolated is 2-amino-3-(2-bromoethyl)-5,6-dihydrobenzo[h]quinazolin-4(3H)-one.

(B) *2-amino-5,6-dihydro-3-vinylbenzo[h]-quinazolin-4(3H)-one.*—A mixture of 10 parts of 2-amino-3-(2-bromoethyl)-5,6-dihydrobenzo[h]quinazoline - 4(3H)-one and 10 parts of potassium tert-butoxide in 200 parts of xylene is heated at the boiling point under reflux for 5 hours. The resultant mixture is chilled to approximately 10°, whereupon insoluble solids are filtered out, washed with water to remove potassium bromide, and dried in air. The material thus isolated is 2-amino-5,6-dihydro-3-vinylbenzo[h]quinazolin-4(3H)-one, having the formula

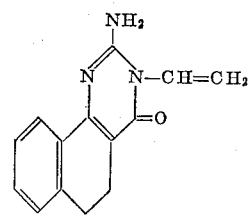

EXAMPLE 7

*3 - allyl - 2 - amino - 5,6 - dihydrobenzo[h]quinazolin-4(3H)-one.*—Substitution of 18 parts of allyl bromide for the methyl iodide called for in Example 2 affords, by the procedure there detailed, 3-allyl-2-amino-5,6-dihydrobenzo[h]quinazolin-4(3H)-one, having the formula

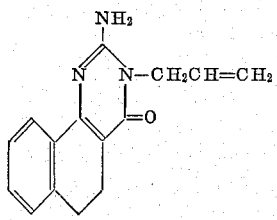

EXAMPLE 8

*2 - amino - 5,6 - dihydro - 3 - methylallylbenzo[h]quinazolin-4*(3H)*-one.*—Substitution of 20 parts of methylallyl bromide for the methyl iodide called for in Example 2 affords, by the procedure there detailed, 2-amino-5,6-dihydro - 3 - methylallylbenzo[h]quinazolin-4(3H)-one, having the formula

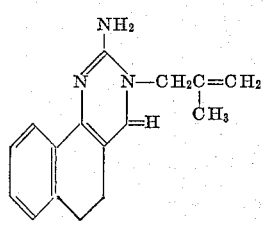

EXAMPLE 9

*2 - amino - 5,6 - dihydro - 3 - (2 - propynyl)benzo-[h]quinazolin-4*(3H)*-one.*—Substitution of 18 parts of propargyl bromide for the 2-bromoethanol called for in Example 4 affords, by the procedure there detailed, 2-amino - 5,6 - dihydro - 3(2 - propynyl)benzo[h]quinazolin-4(3H)-one, melting at approximately 246–247°. The product has the formula

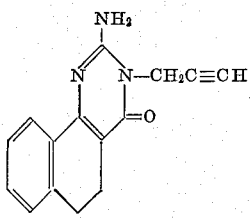

EXAMPLE 10

*2 - amino - 5,6 - dihydro - 8 - hydroxybenzo[h]quinazolin-4*(3H)*-one.*—A mixture of 195 parts of 2-methoxycarbonyl-6-hydroxy-1-tetralone and 180 parts of guanidine carbonate in 800 parts of anhydrous ethanol is heated at the boiling point under reflux with agitation for 20 hours, then freed of ethanol by vacuum distillation. The residue is diluted with 1000 parts of water and the resultant mixture neutralized with glacial acetic acid. Insoluble solids are filtered off, washed thoroughly with water and dried in air. The product thus isolated is 2-amino - 5,6 - dihydro - 8 - hydroxybenzo[h]quinazolin-4(3H)-one, having the formula

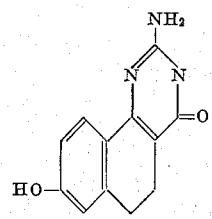

EXAMPLE 11

*2 - amino - 5,6 - dihydro - 8 - methoxybenzo[h]quinazolin-4*(3H)*-one.*—A mixture of 200 parts of 2-methoxycarbonyl-6-methoxy-1-tetralone and 180 parts of quinidine carbonate in 800 parts of anhydrous ethanol is heated at the boiling point under reflux with agitation for 20 hours. Ethanol is then removed by vacuum distillation and the residue diluted with 1000 parts of water. The resultant mixture is neutralized with glacial acetic acid. Insoluble solids are thereupon filtered off, washed thoroughly with water, dried in air, and then further consecutively washed with acetone and ether. The product thus isolated is 2-amino-5,6-dihydro-8-methoxybenzo[h]-quinazolin-4(3H)-one melting above 300°, the formula of which is

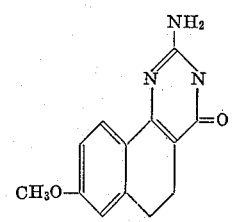

EXAMPLE 12

*2-amino - 5,6 - dihydro-3-(2-hydroxyethyl)-8-methoxybenzo[h]quinazolin - 4*(3H) *- one.*—To a solution of 7 parts of sodium methoxide in 400 parts of methanol is added 24 parts of 2-amino-5,6-dihydro-8-methoxybenzo-[h]quinazolin - 4(3H) - one, followed by 16 parts of 2-bromoethanol. The resultant mixture is heated at the boiling point under reflux with agitation for 18 hours, whereupon methanol is removed by vacuum distillation. The residue is diluted with 1000 parts of aqueous 2% sodium hydroxide and the mixture thus obtained stirred for 2 hours at room temperature. Insoluble solids are filtered off, washed thoroughly with cold water, and dried in air. Recrystallization of the resultant product from methanol affords 2-amino-5,6-dihydro-3-(2-hydroxyethyl)-8-methoxybenzo[h]quinazolin-4(3H)-one melting at approximately 251°. The product has the formula

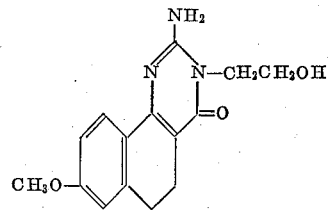

EXAMPLE 13

*2-amino - 5,6 - dihydro - 8 - methoxy-3-(2-propynyl)-benzo[h]quinazolin - 4*(3H) *- one.*—Substitution of 18 parts of propargyl bromide for the 2-bromoethanol called for in Example 12 affords, by the procedure there detailed, 2 - amino-5,6-dihydro-8-methoxy-3-(2-propynyl)-benzo[h]quinazolin-4(3H)-one melting at approximately 260° with decomposition. The product has the formula

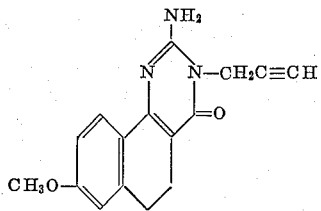

What is claimed is:
1. A compound of the formula

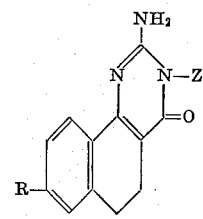

wherein R represents a member of the group consisting of hydrogen, hydroxyl, and lower alkoxyls, and Z represents a member of the group consisting of hydrogen and radicals of the formulas $-C_nH_{2n}X$    $-C_mH_{2m-1}$    $-CH_2C\equiv CH$ X in the formula being selected from the group consisting of hydrogen and hydroxyl, $n$ being a positive integer less than 8, and $m$ being a positive integer greater than 1 and less than 5.

2. 2-amino - 5,6 - dihydrobenzo[h]quinazolin-4(3H)-one.

3. A compound of the formula

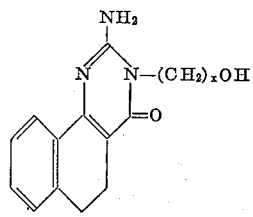

wherein $x$ represents a positive integer less than 3.

4. 2 - amino - 5,6 - dihydro - 3 - (2 - hydroxyethyl)-benzo[h]quinazolin-4(3H)-one.

5. 2-amino - 5,6 - dihydro - 3 - (2-propynyl)benzo[h]-quinazolin-4(3H)-one.

6. 2-amino - 5,6 - dihydro-8-methoxybenzo[h]quinazolin-4(3H)-one.

7. 2-amino - 5,6 - dihydro-3-(2-hydroxyethyl-)-8-methoxybenzo[h]quinazolin-4(3H)-one.

8. 2 - amino - 5,6 - dihydro-8-methoxy-3(2-propynyl)-benzo[h]quinazolin-4(3H)-one.

No references cited.

HENRY R. JILES, *Acting Primary Examiner.*

MARY E. O'BRIEN, *Assistant Examiner.*